No. 741,111. PATENTED OCT. 13, 1903.
C. E. COLBERT.
HAY LOADER.
APPLICATION FILED MAY 21, 1903.
NO MODEL. 3 SHEETS—SHEET 1.
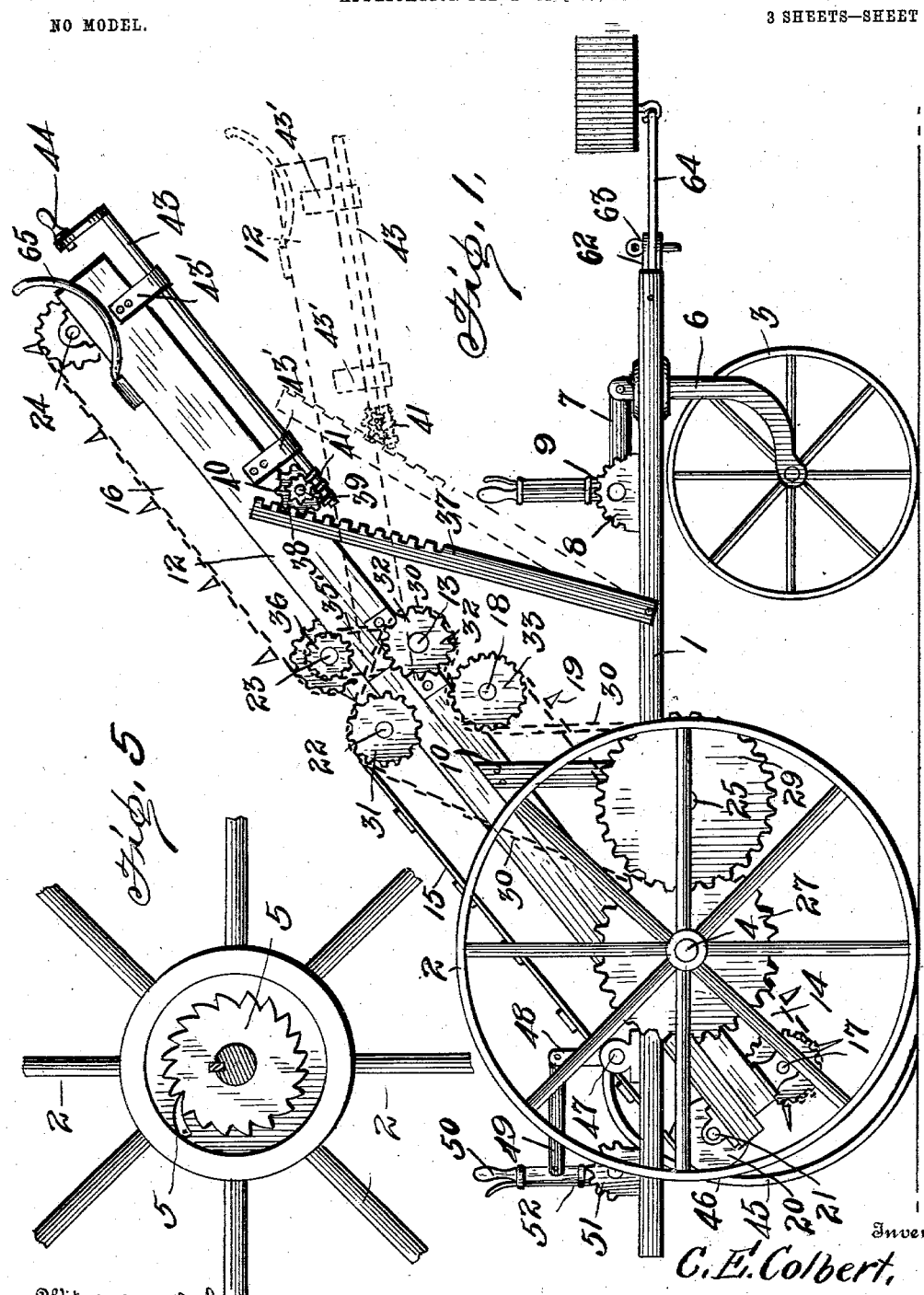
Inventor
C. E. Colbert,
By H. B. Wilson,
Attorney
Witnesses
Jas Koehl No. 741,111. PATENTED OCT. 13, 1903.
C. E. COLBERT.
HAY LOADER.
APPLICATION FILED MAY 21, 1903.
NO MODEL. 3 SHEETS—SHEET 2.
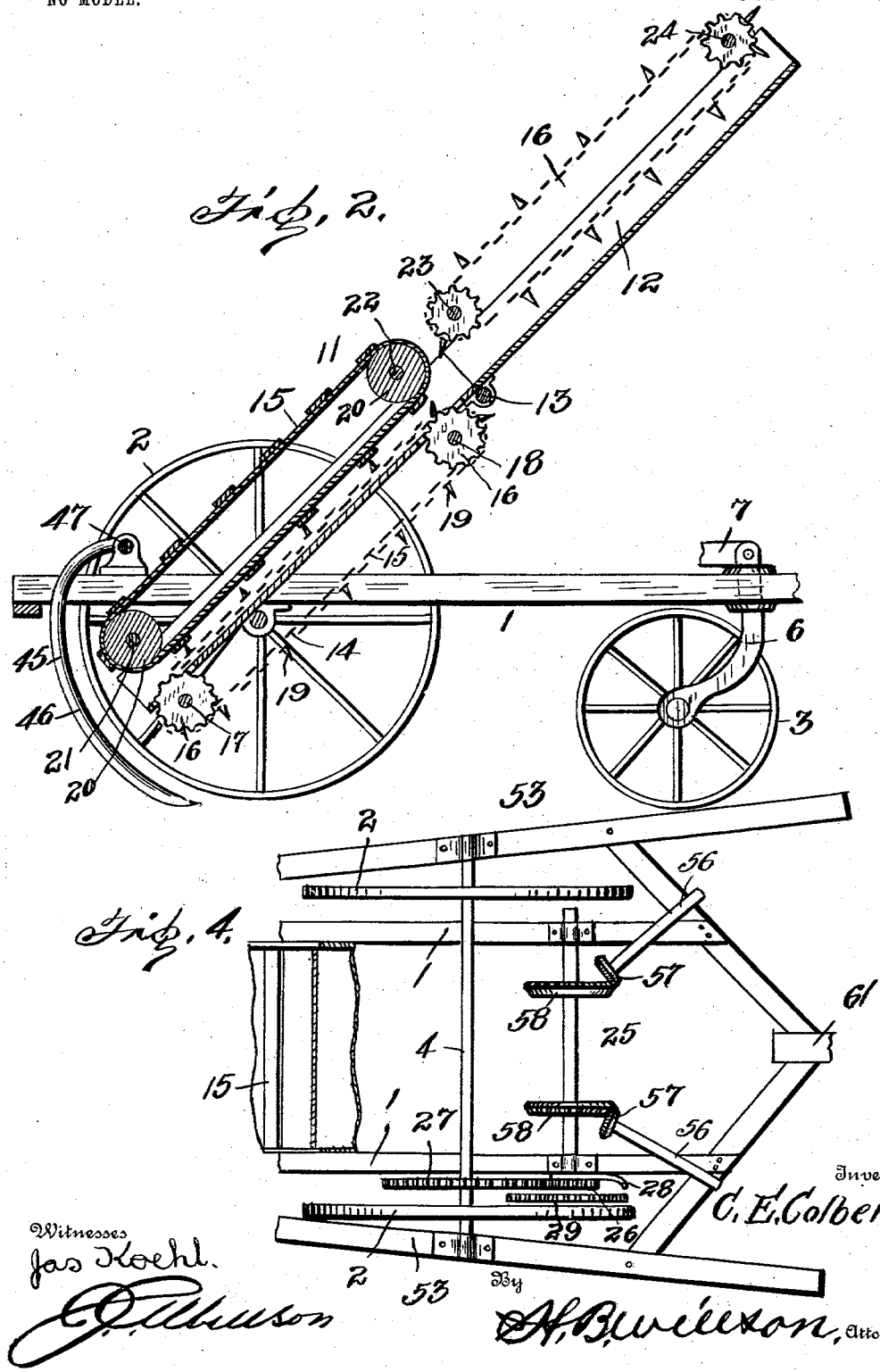

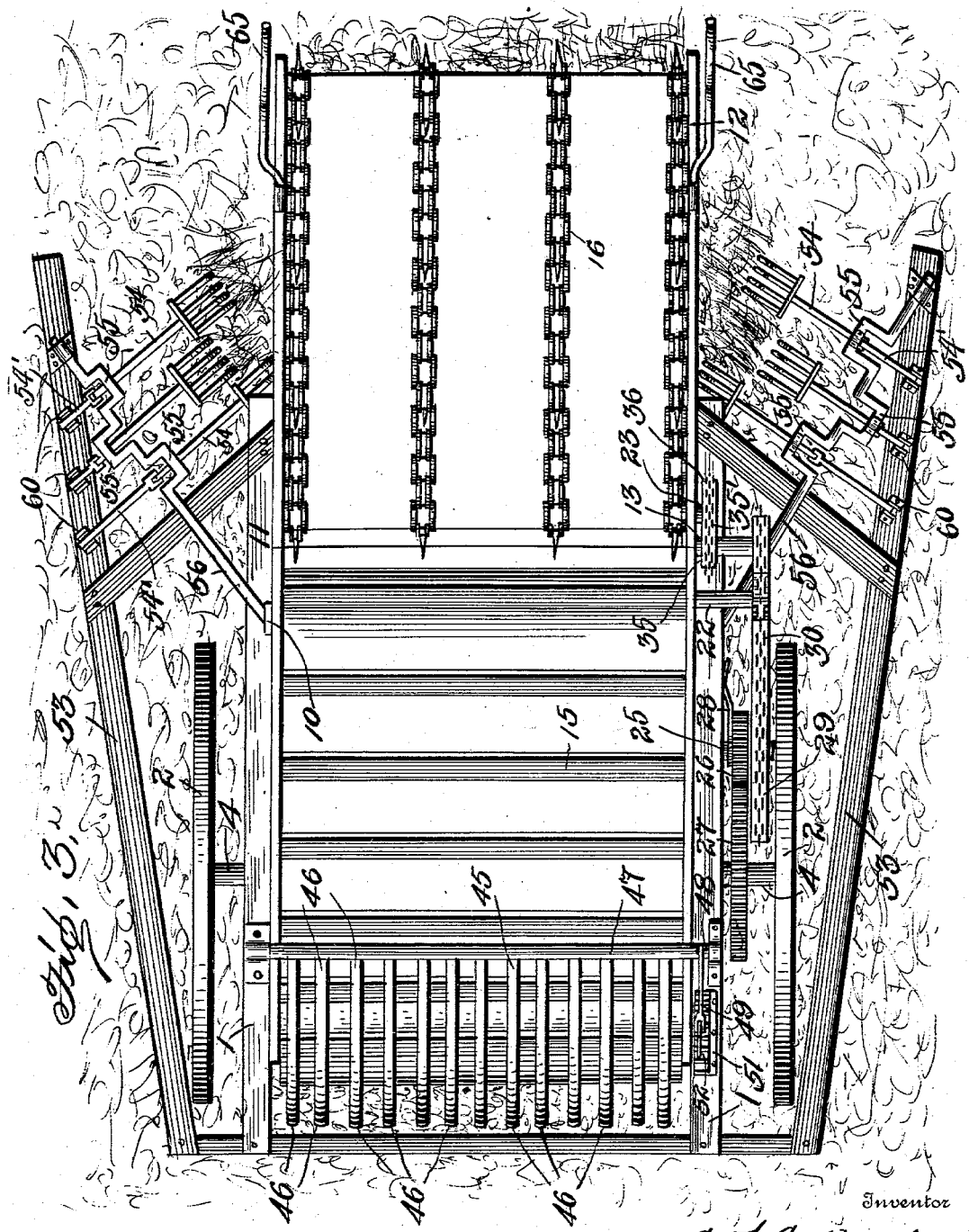

No. 741,111. Patented October 13, 1903.

UNITED STATES PATENT OFFICE.

CASSIUS E. COLBERT, OF JEFFERSON, IOWA, ASSIGNOR OF ONE-HALF TO R. P. MORDEN AND R. B. MORDEN, OF JEFFERSON, IOWA.

HAY-LOADER.

SPECIFICATION forming part of Letters Patent No. 741,111, dated October 13, 1903.

Application filed May 21, 1903. Serial No. 158,191. (No model.)

*To all whom it may concern:*

Be it known that I, CASSIUS E. COLBERT, a citizen of the United States, residing at Jefferson, in the county of Greene and State of Iowa, have invented certain new and useful Improvements in Hay-Loaders; and I do declare the following to be a full, clear, and exact description of the invention, such as will enable others skilled in the art to which it appertains to make and use the same.

My invention relates to hay-loaders, and more particularly to improvements in that class of machines which are attached to the rear end of a wagon and which rake the hay or grain together and discharge the same by means of an endless conveyer or elevator into the wagon.

The object of the invention is to improve the construction and increase the capacity and efficiency of this class of machines.

With this and other objects in view the invention consists of certain novel features of construction, combination, and arrangement of parts, as will be more fully described, and particularly pointed out in the appended claim.

In the drawings, Figure 1 is a side elevation of my improved hay-loader, showing the same attached to a wagon and indicating in dotted lines the lowered position of the conveyer, the side rakes or gatherers being omitted to more clearly illustrate the parts shown and the upper elevator-adjusting mechanism being also omitted. Fig. 2 is a vertical longitudinal sectional view through the same. Fig. 3 is a top plan view. Fig. 4 is a horizontal sectional view through a portion of the machine, showing the gearing for actuating the side rakes or gatherers. Fig. 5 is a detail elevation of one of the rear drive-wheels, showing its pawl-and-ratchet connection with the axle, the latter being shown in section.

Referring to the drawings by numerals, 1 denotes the main frame of the loader, which is mounted upon the rear drive-wheels 2 and the front supporting-wheel 3. The wheels 2 are loosely mounted upon the axle 4, which is journaled in suitable bearings upon the under side of the frame 1. The wheels 2 are adapted to be locked to the axle as the machine is moved forward by the pawl-and-ratchet connection 5 and are permitted to turn freely upon said axle when the machine is backed. The front wheel 3 is journaled in the forked end of a vertical shaft 6, which passes through suitable bearings in the frame 1 and has its upper end pivoted to a bell-crank lever 7, by means of which said shaft 6 may be raised or lowered in order to vary the height of the front portion of the frame 1 from the ground. The lever 7 is pivoted at its angle to a segmental rack-plate 8 and is provided with the usual hand-operated pawl 9, which engages the rack-plate to lock the lever in the desired position.

Secured to the frame 1 at a point in rear of the axle 4 is a frame 10, which supports the elevator 11. This frame 10 is inclined forwardly and upwardly and has an upper portion or frame 12, which is hinged to the frame 10 upon a cross-shaft 13. The elevator comprises the three endless carriers 14, 15, and 16, which are mounted in these frames 10 and 12.

The conveyer 14 consists of a series of sprocket-chains 15, passed about sprocket-wheels 16 upon the shafts 17 and 18, which are journaled in suitable bearings upon the under side of the frame 10. These chains are provided with suitable fingers or projections 19, which assist in picking up the hay or grain from the ground and which project and travel through longitudinal slots formed in the frame 10.

The conveyer 15 coacts with the conveyer 14, being disposed above the same and consisting of a slatted belt, which travels about the rollers 20 upon the shafts 21 and 22, which are journaled in suitable bearings upon the top of frame 10. This belt 15 holds the hay down upon the conveyer 14.

The conveyer 16 is similar to the conveyer 14 and is disposed above the swinging frame 12. The lower stretch or run of the chains of this conveyer coact with the bottom of the frame 12 to carry the hay or straw from the conveyers 14 and 15 upwardly to the end of said frame 12 to discharge the same upon the wagon. These chains are run about sprocket-wheels upon the shafts 23 and 24, which are suitably journaled upon the top of the frame 12.

Journaled in suitable bearings upon the under side of frame 1 is a transverse drive-shaft 25, which is provided with a pinion 26, having a sliding movement upon said shaft, but which is keyed to rotate therewith. This pinion is adapted to mesh with a gear 27, fixed to the axle 4. A pivoted hand-lever 28 is provided, which engages said pinion and is adapted to move the same out of mesh with said gear, and thereby throw the conveyers of the elevator out of operation.

Upon one end of the shaft 25 is a sprocket-wheel 29, which is connected by the sprocket-chain 30 to the sprocket-wheels 31, 32, and 33, secured, respectively, on the ends of the shafts 22 13 18, as clearly shown in Fig. 1 of the drawings. It will be seen that through this connection the conveyers 14 and 15 will be driven in the proper direction. Upon the shaft 13 is a sprocket 35, which is connected by a sprocket-chain 35' to another sprocket-wheel 36, secured upon the shaft 23 in order to drive the conveyer 16.

The conveyer 16 and the frame 12, in which it is mounted, may be swung and held at any desired angle with respect to the frame 10 by pivoting to the frame 1 the rack-bar 37, which is engaged by a gear 38, secured upon a shaft 39, suitably journaled upon the under side of the frame 12. Said shaft is also provided with a gear 40, which is engaged by the worm 41 upon the end of an operating-shaft 43, which is journaled in bearings 43 and provided at its upper end with a crank-handle 44. By operating this handle it will be seen that said hinged frame and its conveyer may be lowered or raised, as shown by the dotted lines in Fig. 1 of the drawings.

65 denotes guards mounted upon the upper end of the frame 12.

The rake 45 is mounted upon the frame 1 in rear of the elevator 11. The curved spring-teeth 46 of this rake are attached to a cross bar or shaft 47, which is journaled in suitable bearings upon the top of frame 1. Said shaft is provided with an arm 48, which is pivotally connected by a link 49 to an operating-lever 50, by means of which the rake may be raised or lowered. Said operating-lever is pivoted to a segmental rack-plate 51 and is provided with a hand-operated pawl 52, which is adapted to engage the rack-plate 51 and hold said rake in an adjusted position.

Upon each side of the main frame 1 are angularly-disposed supplemental frames 53, in which the side rakes or gatherers 54 are mounted. These gathering-arms 54 are pivoted upon the crank portions 55 of a shaft 56, which is journaled in bearings in the frames 1 and 53. The inner ends of these shafts are provided with the bevel-gears 57, which mesh with similar gears 58, secured upon the drive-shaft 25. By this connection it will be seen that the crank-shaft 56 will be rotated upon the rotation of the shaft 25. The lower ends of the arms 54 are provided with the rakes or forks 59, which gather the hay or grain and throw the same into the path of the rake 45. The upper ends of these arms 54 are loosely connected by links 54' to the braces or brackets 60, secured to the frames 53.

The loader may be secured to the rear end of a wagon in any desired manner. I preferably provide the tongue 61 with the clevis 62, the pin 63 of which is engaged with a link or rod 64 upon the wagon.

The operation of the machine is as follows: When the wagon moves forward, the rotation of the drive-wheels 2 will impart motion to the drive-shaft 25 when the gears 26 and 27 are in mesh with each other. The motion of the drive-shaft will be imparted to the several conveyers through the sprocket-chains and gearing previously described, and the side rakes or gatherers 54 will also be set in motion to throw the hay or grain into the path of the rake 45, as previously explained. As the rake 45 gathers the hay it will be carried up between the conveyers 14 and 15 and then up under conveyer 16 to the top of the elevator, where it will be discharged into the wagon. By operating the crank-handle 44 the frame 12 and its conveyer 16 may be tilted at any desired angle, as previously described. By operating the lever 28 to disengage the gears 26 and 27 the conveyers may be thrown out of operation, and by operating the lever 50 the rake 45 may be thrown up out of operation. The side gatherers or rakes 54 may be elevated by operating the lever 7 to raise the forward end of the frame 1.

It will be seen from the foregoing description that I have provided a simple and durable machine which will rake a broad space in a very thorough manner.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

In a hay-loader, the combination of a wheeled frame, an elevator-frame secured to said wheeled frame consisting of a lower fixed frame and an upper swinging frame, endless conveyers mounted in said elevator-frame, means for adjusting the upper portion or frame of the elevator, comprising a rack-bar pivoted to the wheeled frame, a shaft mounted on the upper portion of the elevator-frame, a gear upon said shaft meshing with said rack-bar and an operating-shaft geared to the first-mentioned shaft for operating the same, and a rake mounted in rear of the elevator-frame, substantially as described.

In testimony whereof I have hereunto set my hand in presence of two subscribing witnesses.

CASSIUS E. COLBERT.

Witnesses:
RUTH M. HARPER,
R. B. MORDEN.